United States Patent
George

(10) Patent No.: US 11,330,077 B2
(45) Date of Patent: *May 10, 2022

(54) SERVER-SIDE CACHING FOR WEB USER INTERFACES

(71) Applicant: Nasdaq, Inc., New York, NY (US)

(72) Inventor: Santhosh Philip George, Bangalore (IN)

(73) Assignee: NASDAQ, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/245,024

(22) Filed: Apr. 30, 2021

(65) Prior Publication Data

US 2021/0274012 A1   Sep. 2, 2021

Related U.S. Application Data

(63) Continuation of application No. 16/859,359, filed on Apr. 27, 2020, now Pat. No. 11,025,744, which is a continuation of application No. 16/400,169, filed on May 1, 2019, now Pat. No. 10,652,359, which is a (Continued)

(30) Foreign Application Priority Data

Jul. 30, 2015   (IN) .............................. 2346/del/2015

(51) Int. Cl.
*H04L 29/08*   (2006.01)
*H04L 67/60*   (2022.01)
*H04L 67/02*   (2022.01)
*H04L 67/01*   (2022.01)
*H04L 67/568*   (2022.01)
*H04L 67/10*   (2022.01)

(52) U.S. Cl.
CPC .............. *H04L 67/32* (2013.01); *H04L 67/02* (2013.01); *H04L 67/10* (2013.01); *H04L 67/2842* (2013.01); *H04L 67/42* (2013.01)

(58) Field of Classification Search
CPC ..... H04L 67/32; H04L 67/02; H04L 67/2842; H04L 67/10; H04L 67/42; G06F 3/0482
See application file for complete search history.

(56) References Cited

U.S. PATENT DOCUMENTS 10,320,941 B2   6/2019   George
10,652,359 B2   5/2020   George
11,025,744 B2 *   6/2021   George ................... H04L 67/02
(Continued)

*Primary Examiner* — Kim T Nguyen

(74) *Attorney, Agent, or Firm* — Nixon & Vanderhye, PC

(57) ABSTRACT

The described technology relates to rendering a client-side user interface using a server-side cache for providing the displayed data. In an example implementation, in response to a user interface (e.g., dashboard with multiple widgets in a web application) being launched on the client device, the server initiates a refresh of the cache for the widgets; and transmits a first set of data obtained from the cache for widgets in the user interface before the cache is updated in response to the initiated refresh. The first set of data is followed by a second set of data obtained from the cache for at least some of the widgets after the cache is updated in response to the initiated refresh. The client displays the user interface using the second set of data while overwriting, for one or more of the widgets, information previously displayed using the first set of data.

17 Claims, 11 Drawing Sheets

Related U.S. Application Data continuation of application No. 15/220,522, filed on Jul. 27, 2016, now Pat. No. 10,320,941.

(56) References Cited

U.S. PATENT DOCUMENTS

| | | | |
|---|---|---|---|
| 2010/0162126 A1* | 6/2010 | Donaldson | G06F 16/9574 715/738 |
| 2013/0275890 A1* | 10/2013 | Caron | G06Q 30/0241 715/760 |

* cited by examiner

```
<DashboardWidgetConfig>
<!--Service Provider Details-->
<Providers>
    <Provider Name="ResearchWidgetDataProvider" Type="Nasdaq.Corporate.Portal.Financial.Gateway.WidgetDataProviders.ResearchWidgetDataProvider, Nasdaq.Corporate.Portal.Financial.Gateway" />
    <Provider Name="EstimateWidgetDataProvider" Type="Nasdaq.Corporate.Portal.Financial.Gateway.WidgetDataProviders.EstimateWidgetDataProvider, Nasdaq.Corporate.Portal.Financial.Gateway" />
</Providers>
<Widgets>
    <Widget>
        <Id>103</Id>
        <Name>researchWidget</Name>
        <EntitlementCodes>0</EntitlementCodes>
        <IsCacheable>true</IsCacheable>
        <HasFilterCriteria>false</HasFilterCriteria>
        <IsVisible>true</IsVisible>
        <IsEnabled>true</IsEnabled>
        <Namespace>Financial.research</Namespace>
        <RefreshInterval>10m</RefreshInterval>
        <ProviderName>ResearchWidgetDataProvider</ProviderName>
        <RefreshOnContextChange>false</RefreshOnContextChange>
    </Widget>
    <Widget>
        <Id>104</Id>
        <ModuleId>200000000</ModuleId>
        <FeatureId>300000</FeatureId>
        <Name>estimatesWidget</Name>
        <EntitlementCodes>0</EntitlementCodes>
        <IsCacheable>true</IsCacheable>
        <HasFilterCriteria>false</HasFilterCriteria>
        <IsVisible>true</IsVisible>
        <IsEnabled>true</IsEnabled>
        <Namespace>Financial.estimates</Namespace>
        <RefreshInterval>10m</RefreshInterval>
        <ProviderName>EstimateWidgetDataProvider</ProviderName>
        <RefreshOnContextChange>false</RefreshOnContextChange>
    </Widget>
```

FIG. 5

```
<DashboardLayoutConfig>
  <Layouts>
    <Layout Name="default" Id="1">
    <!--Need to re-write the layout-->
      <Widgets>
        <WidgetInfo id="107" Pos="LHS1" />
        <WidgetInfo id="108" Pos="rhs1" />   ⎫
        <WidgetInfo id="109" Pos="rhs2" />   ⎬ 602
      </Widgets>                             ⎭
    </Layout>
    <Layout Name="mobile" Id="2">
    <!--Need to re-write the layout-->
      <Widgets>
        <!--Market data-->
        <WidgetInfo id="201" Pos="rhs1" />
        <!--Dashboard Chart-->
        <WidgetInfo id="202" Pos="rhs2" />
        <!--CompanyCount-->
        <WidgetInfo id="203" Pos="rhs3" />
        <!--PeerCard-->
        <WidgetInfo id="204" Pos="rhs4" />
        <!--researchLatestReport-->                604
        <WidgetInfo id="205" Pos="rhs5" />
        <!--estimatesRevision-->
        <WidgetInfo id="206" Pos="rhs6" />
        <!--estimatesConsensus-->
        <WidgetInfo id="207" Pos="rhs7" />
        <!--RecentNews-->
        <WidgetInfo id="208" Pos="rhs8" />
        <!--upcoming Events-->
        <WidgetInfo id="209" Pos="rhs9" />
        <!--recentStreetEvents/transcripts-->
        <WidgetInfo id="210" Pos="rhs10" />
      </Widgets>
    </Layout>
  </Layouts>
</DashboardLayoutConfig>
```

| Column Name | Data Type |
|---|---|
| Id | int |
| WidgetId | int |
| ViewTypeId | int |
| [Key] | nvarchar[50] |
| Value | image |
| Expiry | datetime |
| LastUpdated | datetime |
| UpdatedByUI | bit |
| UserId | bigint |
| LayoutId | int |

FIG. 7

```
namespace Nasdaq.Corporate.Portal.Infrastructure.Common.Dashboard
{
    public interface IWidgetDataProvider
    {
        ContextInfo CorpContext { get; set; }

WidgetCacheResponseBase GetData(IWidgetSetting setting, int layoutId);

WidgetCacheResponseBase GetData(WidgetCache cache);

void SavePreference(object widgetPreference, int widgetId, string name);
    }
}
```

FIG. 9

SERVER-SIDE CACHING FOR WEB USER INTERFACES

CROSS-REFERENCE TO RELATED APPLICATIONS

This application is a continuation of U.S. patent application Ser. No. 16/859,359 filed Apr. 27, 2020 which is a continuation of U.S. patent application Ser. No. 16/400,169 filed May 1, 2019, which is a continuation of U.S. patent application Ser. No. 15/220,522 filed Jul. 27, 2016, now U.S. Pat. No. 10,320,941 issued Jun. 11, 2019, which claims the benefit of priority of the Indian Patent Application No. 2346/DEL/2015 filed on Jul. 30, 2015, the entire contents of which are incorporated herein by reference.

BACKGROUND

Many enterprise software applications are designed as web-based applications ("web applications") so that they can be accessed from anywhere and/or using almost any processing device that can run a web browser. A web application comprises client-side components and server-side components that communicate with each other using protocols including the HTTP protocol. Client-side components of a web application are typically responsible for handling the user interface by presenting (e.g., displaying) information to the user through a user interface on the user's access device; receiving user input, etc. Server-side components are responsible for tasks including either itself generating or obtaining information from data sources to be presented to the user in accordance with received inputs.

As the complexity of underlying web applications grow, the volume of data transmitted to the client-side components from the server-side components increases. Moreover, as the number of users and/or the frequency with which the application are accessed increases, the processing load on the servers may increase. Increases in the volume of data transmitted from servers to client devices, server delays due, for example, to processing load and/or latencies associated with network access to remote data sources, may often result in users of web applications having to endure long response times.

Various techniques including caching of rendered data so that the same data can be quickly displayed the next time the user interface is brought up, are used to improve the user experience and/or the performance of the user interface. Further improvements to these technologies are desirable to enhance web applications by improving both the accuracy and the performance of dashboards.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

SUMMARY

An example embodiment provides a system comprising a server device including a cache, and a client device. The cache is configured to store, for each of a plurality of users, data for a plurality of widgets that are displayable on a user interface provided by a web application on the client-device. The server device is configured to: responsive to the user interface being launched on the client device, initiate a refresh of the cache for one or more of the plurality of widgets; and transmit, to the client device, a first set of data obtained from the cache for one or more of the widgets before the cache is updated in response to the initiated refresh, followed by a second set of data obtained from the cache for at least some of the one or more widgets after the cache is updated in response to the initiated refresh. The client device is configured to receive a request to display a user interface provided by a web application, the user interface being configured to have a plurality of widgets arranged thereon; receive, in response to a first data request transmitted to the server device after receiving the request to display the user interface, the first set of data; receiving, in response to a second data request transmitted to the server device after the first data request, the second set of data; and displaying the user interface on the display device using the second set of data, wherein the displaying includes overwriting, for one or more of the widgets, information previously displayed using the first set of data.

The client device may be configured to perform further operations comprising repeatedly transmitting data requests for at least one of the widgets for which last returned data is from the cache before the cache is updated for the at least one widget.

The initiating a refresh of the cache may comprise asynchronously performing the refresh.

The server device may be configured to perform further operations including: in response to receiving a data request from the client, determining whether a number of repeated data requests exceeds a configured threshold; when the repeated data requests exceeds the threshold, directly access a data source to obtain data; and return obtained data to the client device.

The user interface may include a dashboard having a plurality of widgets arranged thereon.

The client device may be configured to transmit each data request with an included indication of a retry number, and the server device may be configured to perform different actions for respective values of the retry numbers associated with each data request.

The server device may be configured to perform further operations including: when initiating the refresh, setting at least one flag indicating a status of data for a widget in the cache; in response to receiving a data request having a retry number corresponding to a predetermined retry number, (1) if the at least one flag is not set, initiate a refresh of the cache and set the at least one flag; and (2) if the at least one flag is set, return data from the cache to the client device.

The server device may be further configured to initiate an asynchronous refresh of the cache in response to receiving a data request with a first retry number, and to initiate a synchronous update of the cache in response to receiving a data request with a second retry number, the first and second retry numbers being different.

The client device may be configured to perform further operations including: monitoring cache expiration times for a plurality of widgets arranged on the user interface; based upon the monitoring, determining an expiration of cached data for a first one of the widgets; and causing a refresh of data in the cache for the first one of the widgets.

The server device may be configured to perform further operations: storing a respective update timer for each of a plurality of widgets; monitoring the update timers; and when an update of a widget comes due, requesting an update.

Another embodiment provides a server device comprising a memory configured for a cache. The server device is configured to perform operations comprising: configuring the cache to store, for each of a plurality of users, data for a plurality of widgets that are displayable on a user interface provided by a web application; responsive to the user interface being launched on a client device, initiating a refresh of the cache for one or more of the plurality of widgets; and transmitting, to the client device, a first set of data obtained from the cache for one or more of the widgets before the cache is updated in response to the initiated refresh, followed by a second set of data obtained from the cache for at least some of the one or more widgets after the cache is updated in response to the initiated refresh.

Another embodiment provides a client device comprising a display device, a network communication interface configured to communicate with a server device. The server device is configured to perform operations comprising: receiving a request to display a user interface of a web application, the user interface being configured to have a plurality of widgets arranged thereon; receiving, in response to a first data request transmitted to the server device after receiving the request to display the user interface, a first set of data; receiving, in response to a second data request transmitted to the server device after the first data request, a second set of data; and displaying the user interface on the display device using the second set of data, wherein the displaying includes overwriting, for one or more of the widgets, information previously displayed using the first set of data. The first set of data may be obtained from a cache for one or more of the widgets before the cache is updated by a refresh of the cache initiated in response to the user interface being launched on the client device, and wherein the second set of data may be obtained from the cache after the cache is updated by the initiated refresh.

Another example embodiment provides a method comprising: configuring a cache to store in a memory of a computer, for each of a plurality of users, data for a plurality of widgets that are displayable on a user interface provided by a web application; responsive to the user interface being launched on a client device, initiating a refresh of the cache for one or more of the plurality of widgets; and transmitting, to the client device, a first set of data obtained from the cache for one or more of the widgets before the cache is updated in response to the initiated refresh, followed by a second set of data obtained from the cache for at least some of the one or more widgets after the cache is updated in response to the initiated refresh.

Another embodiment provides a non-transitory computer readable storage medium storing instructions of a web application, which, when executed by a computer, causes the computer to perform operations. The operations comprise: configuring a cache in the memory of the computer to store, for each of a plurality of users, data for a plurality of widgets that are displayable on a user interface provided by the web application; responsive to the user interface being launched on a client device, initiating a refresh of the cache for one or more of the plurality of widgets; and transmitting, to the client device, a first set of data obtained from the cache for one or more of the widgets before the cache is updated in response to the initiated refresh, followed by a second set of data obtained from the cache for at least some of the one or more widgets after the cache is updated in response to the initiated refresh.

Another example embodiment provides a non-transitory computer readable storage medium storing instructions of a web application which, when executed by a computer, causes the computer to perform operations comprising: receiving a request to display a user interface of the web application, the user interface being configured to have a plurality of widgets arranged thereon; receiving, in response to a first data request transmitted to the server device after receiving the request to display the user interface, a first set of data; receiving, in response to a second data request transmitted to the server device after the first data request, a second set of data; and displaying the user interface on the display device using the second set of data, wherein the displaying includes overwriting, for one or more of the widgets, information previously displayed using the first set of data. The first set of data may be obtained from a cache before the cache is updated for one or more of the widgets by a refresh of the cache initiated in response to the user interface being launched on the client device, and wherein the second set of data is obtained from the cache after the cache is updated by the initiated refresh.

This Summary is provided to introduce a selection of concepts in a simplified form that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

FIG. 5 illustrates a part of an example XML configuration file that can be used for configuring a displayed user interface such as a dashboard, according to some embodiments;

FIG. 6 illustrates an XML file for an example user interface layout configuration according to some embodiments;

FIG. 7 illustrates an example database schema that can be used for implementing the server-side cache, according to some embodiments;

FIG. 9 illustrates an example of the interface class according to some embodiments.

DETAILED DESCRIPTION

The embodiments described herein relate to rendering a client-side user interface, such as, for example, display of a web page, using a server-side cache for providing the displayed data. Some example embodiments relate to an investor relations web application ("IR application"), but embodiments are not limited thereto. The use of a server-side cache in accordance with embodiments can significantly improve the performance and the scalability of web applications in comparison to conventional techniques for web page rendering. The performance improvements become even more significant when rendering includes concurrently updating the display with information received from multiple data sources.

Example embodiments provide for refreshing a server-side cache asynchronously in the background, and rendering the client-side user interface using cached information. Refreshing the cache, as used herein, refers to updating the cache by retrieving data from a corresponding data source and either newly storing the retrieved data in the cache or replacing current corresponding data in the cache with the newly retrieved data. Upon receiving a request from the client, the server may return already cached data, even if such data may not be up to date, while the cache is being asynchronously refreshed in the background. By this, the client's display can be speedily updated with at least some data which is likely to be relevant to the user, although not necessarily the most up to date. Subsequently, typically within a short time interval after the initial display, the display is updated with up to date information when the cache is refreshed. The ability to quickly (e.g., almost immediately) have at least some relevant information displayed upon the launching of a certain application can be particularly useful for frequent users of dashboard type user interfaces. Since it may not be essential that some types of information on a dashboard is fully up to date all the time, users who navigate to and away from a dashboard very frequently may find it preferable that some relevant information is displayed within a short response time to be subsequently updated with most current information.

Figure 1:
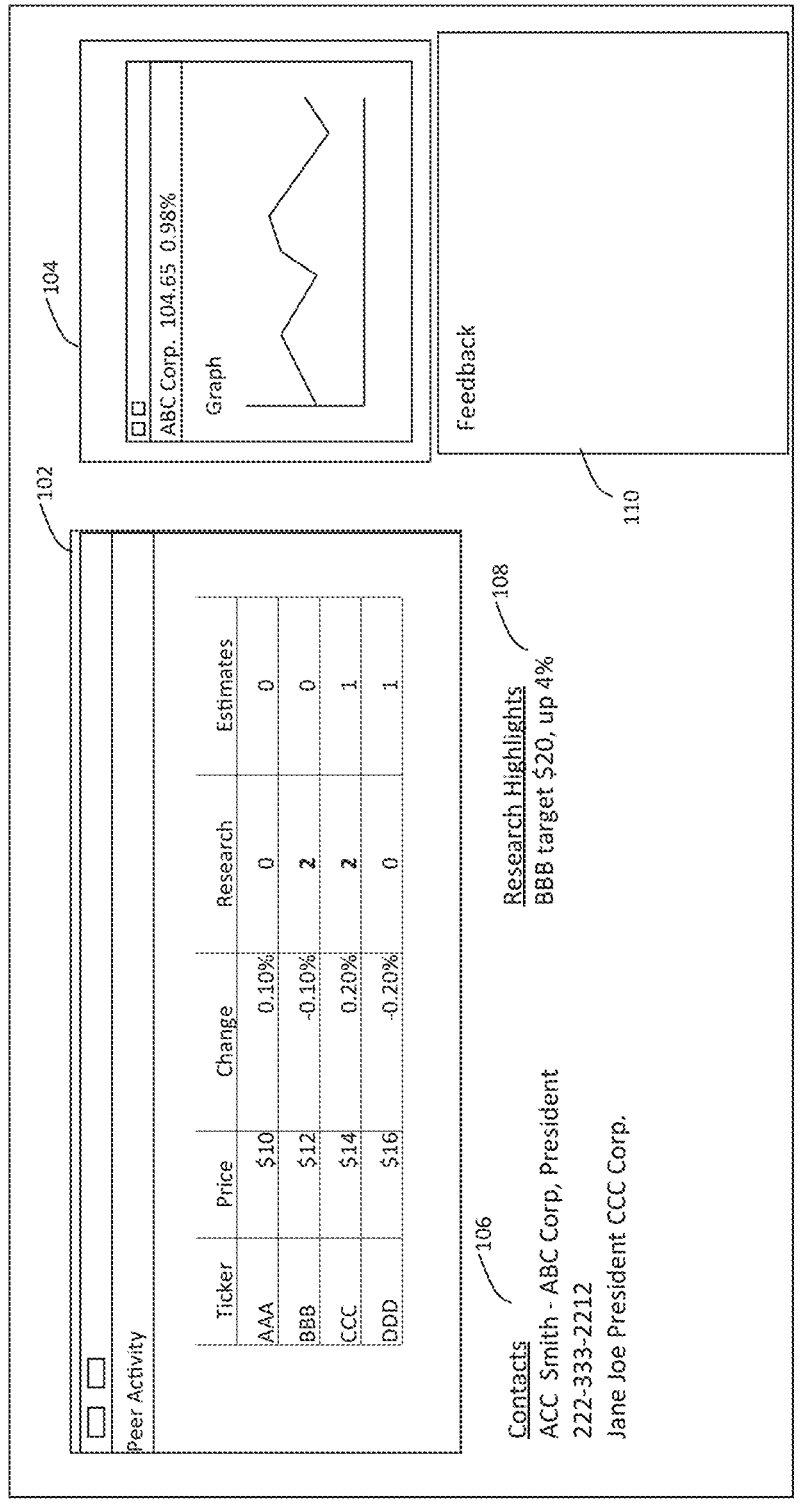
FIG. 1 illustrates a dashboard of the exemplary web-based application according to some embodiments.

A dashboard, as used herein, is a type of user interface that is used for effectively presenting information to a user, e.g., it organizes and presents information in a way that is easy to read. A dashboard may include several subcomponents, with each subcomponent being used to display pieces of information that are respectively different and/or are obtained from different data sources. FIG. 1 illustrates a dashboard 100 of the exemplary IR application according to some embodiments. Dashboard 100 displays, on one page, multiple types of information from different data sources, that an investment advisor may find useful while consulting with a potential investor. The dashboard 100 is content intensive and aggregates content from many sources.

Dashboard 100 includes components 102-110 each of which may be a widget configured to receive and display information that are from different sources. A widget, as the term is used herein, is an application, or a component of an interface, that enables a user to perform a function or access a service. At least some of widgets 102-110 may be designed to, after being initially displayed on the user's screen, to continually have its content updated while they remains visible on the user's screen.

Widget 102 may be configured to receive and display information related to financial performance of peers of a particular investor. This may provide, for each investment position, pricing, quantity, and change in value information. Some of the information may be updated at the data source continuously or near real-time (e.g., pricing, volumes etc.). Indications as to whether additional information such as research reports, estimates and the like are available for each peer may also be provided, and may either be updated dynamically or periodically. Widget 104 may display more detailed information about a particular investment position. For example, as shown, a real-time or near real-time chart of the value of a selected investment from 102 may be shown in widget 104. Widget 106 may display information regarding contacts related to the particular investor. Widget 108 may display highlights relevant to the particular investor. Widget 110 may present a summary of feedback.

At least some of the widgets 102-110 rely on data obtained from external sources, and some widgets may present information derived from information received from internal sources. For example, investment position prices etc., may be received from a first external subscription service, whereas updates regarding estimates, research reports etc. may be obtained from a second subscription service. Updates regarding messages, investment highlights etc., may be obtained from the enterprise's (i.e., the enterprise deploying the web application for its users) own servers. Embodiments operate to alleviate the performance and scalability issues that can be caused due to the different types (e.g., different formats, sizes, etc.), different update requirements (e.g., continuous or near continuous updates, interval updates, scheduled updates, etc.), and/or the different sources (e.g., local sources, external sources with different network access latencies) from which the widgets obtain the data for display.

Thus, dashboard 100 may simultaneously display these multiple widgets that receive their information from different sources so that a summary of the relevant information can be presented to the user. Dashboard 100 may be rendered on the display of a user device as the "landing page" when a user launches the example IR application. For some applications, such as the example IR application, rather than wait for all updated information to be rendered and incurring long response times, a user may find it preferable to quickly have some relevant information with which he/or she can begin using the application initially displayed, while up to date information is obtained after a short delay.

Figure 2:
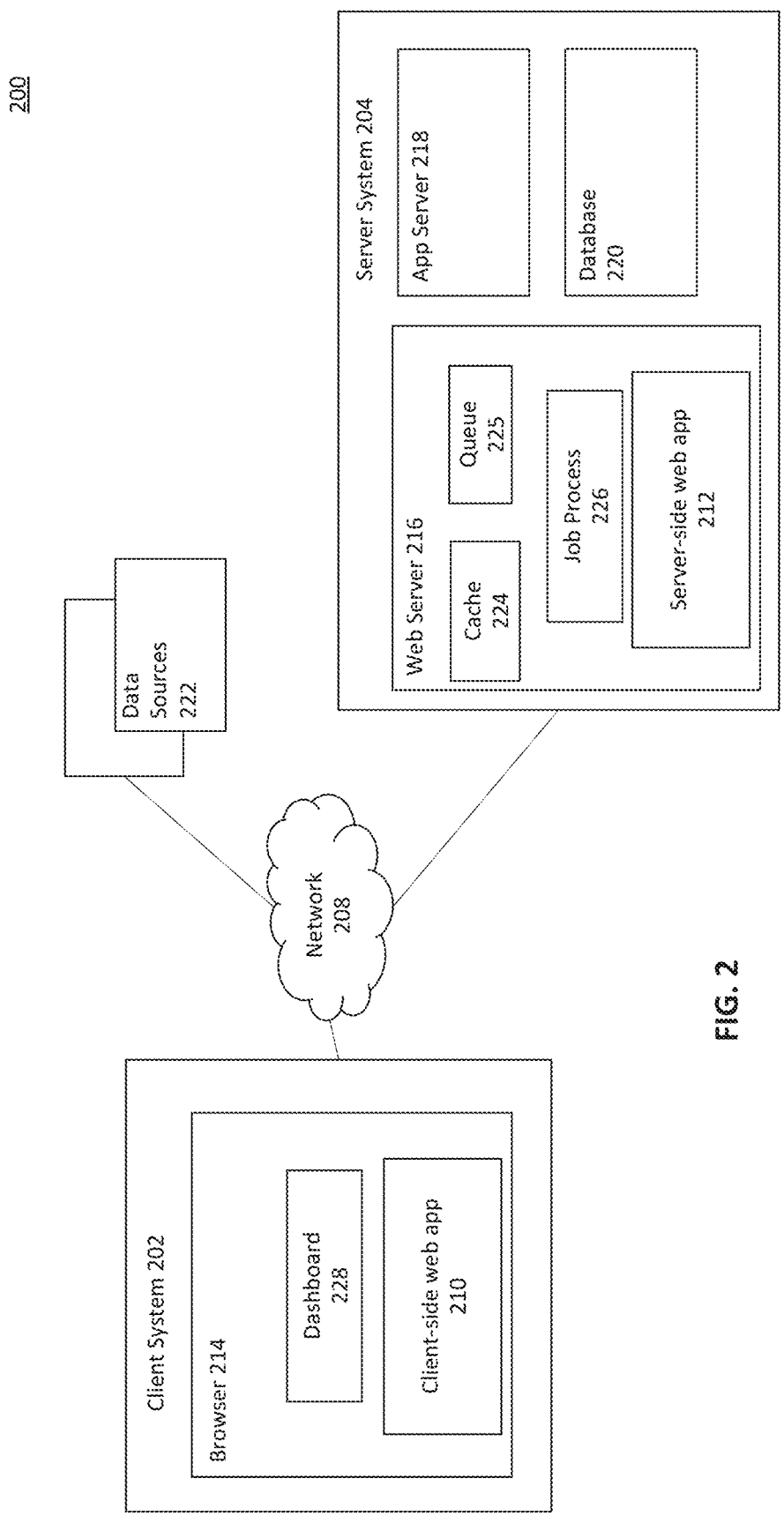
FIG. 2 illustrates an example computing environment in which a client system and a server system communicate with each other over a network to enable a user to use a web application, such as, for example, the application in FIG. 1.

FIG. 2 illustrates an example computing environment 200 in which a client system 202 and a server system 204 communicate with each other over a network 208 to enable the use of a web application, such as, for example, the IR application noted above. It should be appreciated that the network 208 can comprise a network of interconnected computing devices, such as the Internet. The network 208 can also comprise a local area network (LAN) and/or include a peer-to-peer connection between the client system 202 and the server system 204.

The web application includes a client-side web application component ("client-side application") 210 that is executed on the client system 202 and a server-side web application component ("server-side application") 212 that is executed on the server system 204. The client-side application 210 may be executed within a user interface application 214 such as, for example, a browser 214. The server-side application 212 may be executed by a web server 216 and/or application server 218 of server system 204. Web server 216 performs functionality such as implementing the HTTP protocol and communicating with the web browser 214 (described in further detail below) in the client system 210 via HTTP. Data items relating to the web application, such as, for example, configuration and/or performance data, user access, etc., may be stored in a database 220 of the server system 204. Application server 218 can, for example, execute server-side (or "backend") application services. In performing the web application, the web server 216 and/or the application server 218 may access one or more external data sources 222 over network 208 in order to obtain information.

The server-side application 212 may make use of a cache 224 and a job process 226 to cache information, such as information obtained from data sources 222 and/or information generated in the server system 204, and to provide information from the cache 224 to the client system 202. The server-side application 212 may make use of a queue 225 so that job process 226 can asynchronously refresh the cache 224 upon request by the server-side application. The client system 202 may, for example, provide the information received from the server-side application 212 to the user via a dashboard 228 or other web page.

The client system 202 can include software components for performing processing related to applications defined according to the multiple single page application (SPA) or other architecture. As a non-limiting example, the client system 202 may have a web browser application 214 consisting of, at least, a rendering module, a networking module and a JavaScript® module (not shown separately). The rendering module can implement functionality for the graphical display and rendering of web pages. It can, for example, generate graphical data that corresponds to the HTML and/or DOM that defines a web page processed by the web browser 214; this graphical data can, potentially after further modification/transformation by the operating system of the client system 202, be displayed on a display of the client system 202. Alternatively or additionally, whenever it is described in this document that the client system 202 renders/displays a web page, the rendering/displaying module may perform functionality related to the rendering/display of the web page. The networking module can implement the HTTP protocol, and be used to handle various HTTP messages between the client system 202 and the web server 216 in the server system 204. Alternatively or additionally, whenever it is described in this document that the client system 202 communicates using HTTP, the networking module may handle the HTTP aspects of such communications. The JavaScript module can be used to execute JavaScript scripts, manipulate JavaScript objects, modify the DOMs of web pages loaded at the web browser application 211, and perform other functionality related to JavaScript. The JavaScript module may be, for example, a JavaScript engine, a JavaScript virtual machine, a JavaScript runtime, or any other type of software module capable of executing JavaScript instructions. Alternatively or additionally, whenever it is described in this document that the client system 202 performs functionality related to JavaScript, such functionality may be handled by the JavaScript module.

Figure 3A:
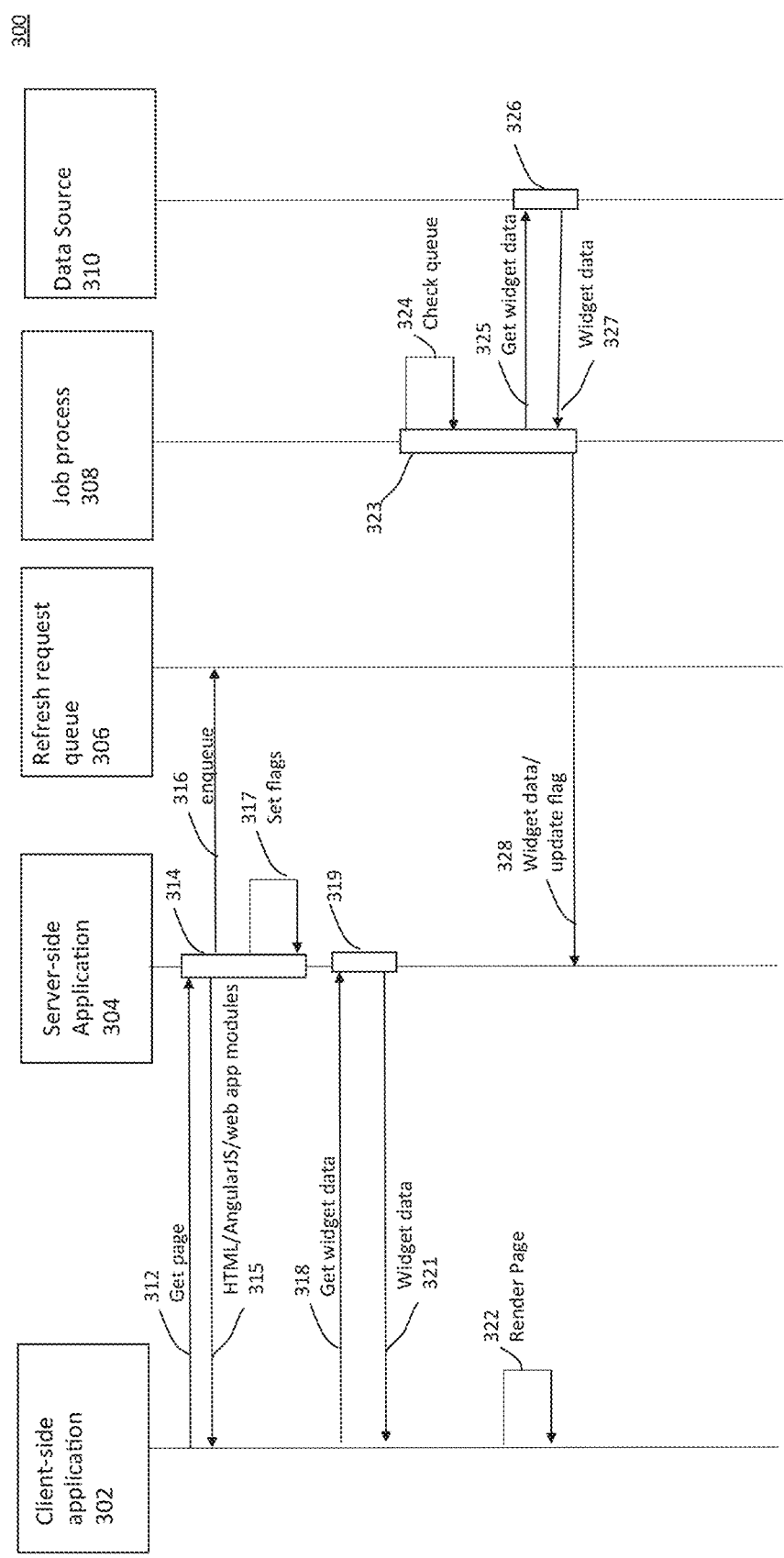
FIG. 3 (3A and 3B) illustrates a flowchart of a process for rendering information using a server-side cache, according to some embodiments.
Figure 3B:
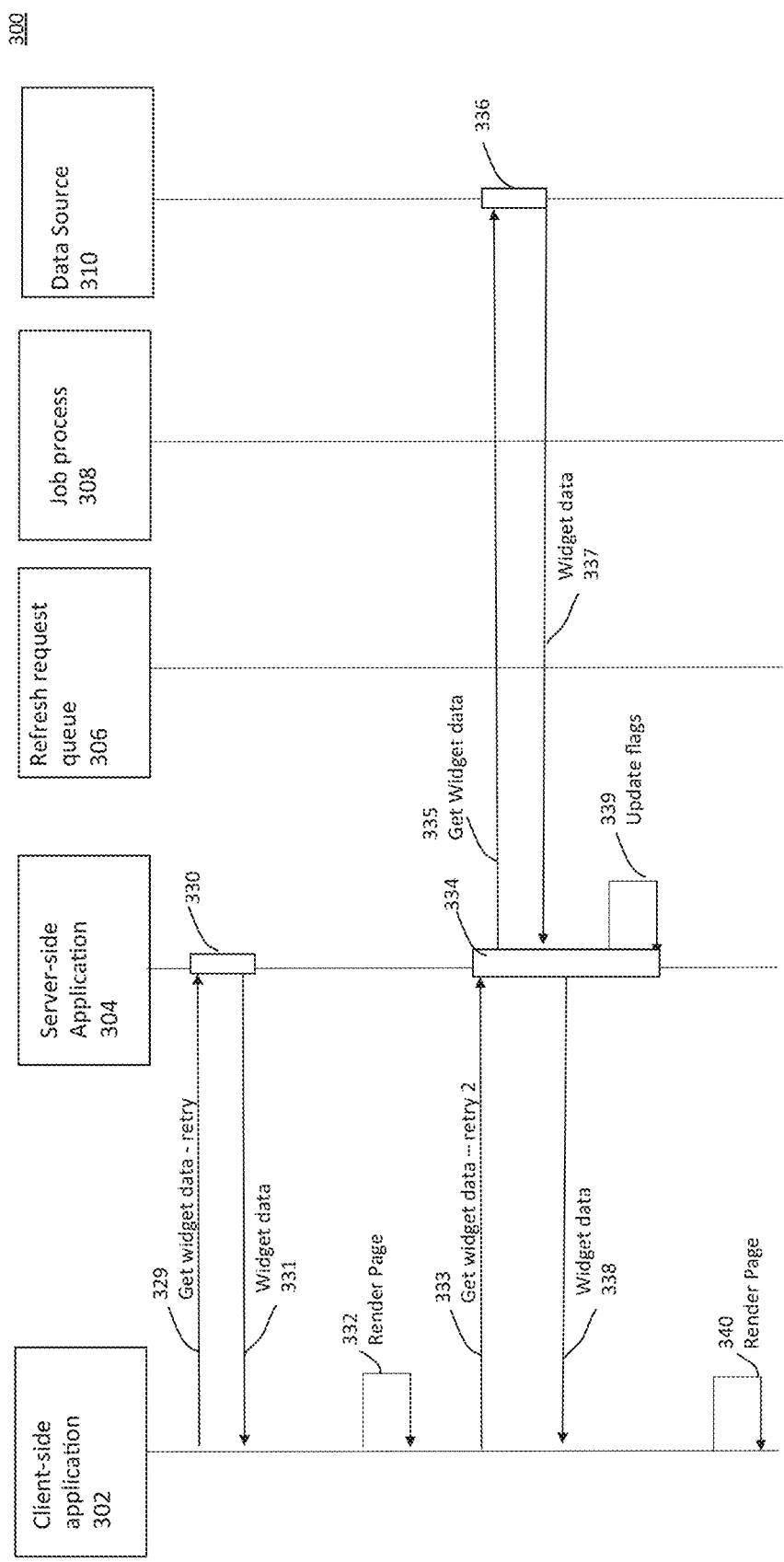

FIG. 3 illustrates a flowchart of a process 300 for rendering a client user interface information using a server-side cache (e.g., cache 224), according to some embodiments. The flowchart illustrates interactions between a client-side application 302, such as, a web application including a dashboard 100, and server-side application 304, such as, a portion of the web application that includes server-side caching of widgets of dashboard 100. In the description below, the messages exchanged between the client side application 302, which, at least in some embodiments execute inside (in the context of) a web browser, and the server-side application 304 include messages in accordance with the HTTP protocol.

Process 300 may be entered when the user launches the web application and/or arrives at a particular web page. For example, when the user launches the example IR application, process 300 may be entered into and the displaying of dashboard 100 as the "landing page" may be started. Client-side application module(s) 210 may be downloaded to the user device from the server system 204. An AngularJS® module may be used to help load the dashboard AngularJS app based on components defined in dashboard configuration files (e.g. FIGS. 5 and 6). The server may be notified of the launching of the dashboard (or launching of a web application which has the dashboard as the landing page) by a model-view-controller (MVC) action from the client (e.g., page load HTTP request) at operation 312. In response, the server may initiate several actions 314. The server may, at operation 315, return client-side application modules 210 to the client-side application so that the web application can be run.

The process of receiving an HTTP request for a web page from a client and downloading of HTML, JavaScript, and AngularJS components to the client for rendering the page on the client and/or to launch an application is described in the co-pending commonly-assigned application entitled "Software Application Framework," U.S. Ser. No. 15/219, 913 and filed on Jul. 26, 2016, which is hereby incorporated by reference in its entirety. The downloaded client-side application module(s) 210 may, in the context of the browser 214, begin the display of dashboard 100. Alternatively, a process for displaying dashboard 100 may be begun when, after having previously started the web application, the user returns to a web page that again displays dashboard 100. Although example embodiments are described in relation to a client browser context, the embodiments may be utilized with any client application that communicates with a server using HTTP. In some example embodiments, the client-side application communicates with the server-side application using HTTP and JSON.

The server includes a cache (e.g., cache 224) for storing data for widgets that are displayable on the dashboard. The cache may include an entry for every widget that is displayable by a particular dashboard, as specified in a configuration file for the particular dashboard. The cache may be initially configured or created in a memory of the server (e.g., a memory in the server system 204) when the web application is launched, and may persist throughout the duration that the web application (e.g., as determined, for example, by the user remaining logged in) even when the user navigates away from the dashboard. Alternatively, even while the web application is active, the cache may be deleted after a predetermined period of time has passed without the user navigating back to the dashboard. As described below in relation to FIG. 4, the cache is refreshed at intervals for widgets that are active in the dashboard.

When the server is notified of the launching of the dashboard 100, the server may, at operation 316, add a request to refresh the cache to a queue 306. The server may request refresh of the data for all widgets configured for a selected layout (e.g., as specified in a configuration file) of the dashboard.

Job process 308 periodically polls the queue 306 for the presence of refresh requests. The job process 308 may be configured to check the queue at a predetermined interval. In some embodiments, the refresh request queue 306 may be a MSMQ™ (Microsoft Message Queuing) queue, and the job process 308 may be a Windows Service™ job. The MSMQ queue may be defined as a private queue in some embodiments when the corresponding process that monitors the queue (e.g., the job process 308) is on the same server as the queue. However, some embodiments may instead and/or in addition use public MSMQ queues for refresh requests when the actual job processors (e.g., such as job processor 308) are distributed over several physical machines in the server system. In some embodiments the queue for refresh requests 306 is serviced according to a first in first out manner—such that the older requests are serviced before the newer requests. However, embodiments are not limited thereto, and other embodiments may implement other queue servicing techniques. For example, some queue servicing techniques may include servicing requests for (or requests that include) certain widgets at a higher priority than requests for other widgets. MSMQ and Windows Service technologies can be used in embodiments to distribute the load associated with servicing the user interfaces among any number of servers by, for example, having a respective MSMQ and a respective job process for each server in a server system operating as part of the backend for the IR Application. The combination of MSMQ for queuing refresh requests and Windows Service for job process 308 enables refreshing the cache without impacting response times and/or increasing the load on web servers.

At operation 317, the server sets one or more flags (referred to as "stale flag") for each of the widgets indicating that a refresh has been initiated (and that the cached data for the corresponding widget is considered stale). That is, for each of the widgets for which cache refresh was requested at operation 316, at least one stale flag is set. Each stale flag may be a bit, which is sufficient to indicate whether the data of the corresponding widget is stale or not. In some embodiments, however, some stale flags may at least be two bits so that three states can be represented—a state representing that the corresponding data is considered stale, a state representing that the corresponding data is partially refreshed (e.g., for use when a widget includes data being refreshed from separate data sources), and a state representing that the corresponding data is refreshed.

At operation 318, the client-side application 302 requests, using an HTTP message, the widget data from the server-side application 304. Operation 318 may include a separate request being made for each widget, a request per group of widgets, or one request for all widgets. In some embodiments, the client-side AngularJS framework may load the widgets into containers based on dashboard configuration (e.g., FIGS. 5 and 6) and request data for the widgets. Once the data for widgets are returned from server, the client framework has the information with respect to where to place the rendered html for each widget. The container may be a placeholder html element with an identifier that can be derived from the widget identifier in response data.

The request may include parameters indicating that this is the first request for widget data. The request may also identify widgets for which data is requested. The first request for widget data may be made immediately after the page is rendered on the client.

The server-side application 304, in response, checks the cache (e.g., cache 224) at operation 319. In some embodiments, the cache may be configured to store widget data on a per user and per widget basis. For example, cache 224 may separately store data for widget A as displayed by user X, and widget A as displayed by user Y. In some embodiments, the cache may store the data on the basis of per user per user device and per widget basis, so that the same user can have sessions on multiple active devices. For example, cache 224 may separately store data for widget A as displayed on user device P by user X, and widget A as displayed on user device Q by user X.

After, based upon the check at operation 319 to determine whether the widget data is in the cache, any widget data found in the cache is returned to the client-side application at operation 321. The widget data may be returned using at HTTP response to the HTTP request received at operation 318. The data in cache may be binary serialized, and needs to be converted to a format which the client-side rendering technology can understand. JSON is a standard that most client side technologies use for data transfer. So, in some example embodiments, the binary serialized data in the cache is converted to its equivalent JSON format before returning the response.

In many, or most, situations what is returned to the server at operation 321 would include stale data because the time elapsed between when the request to refresh is made and when the corresponding widget data is sent to the user may not be sufficient for receiving data from many of the data sources such that the corresponding cache can be refreshed. For example, the elapsed time may be too short for the job process 308 to access one or more external data sources due to network latencies etc. In some situations, one or more widgets' data may be refreshed within the elapsed time, while others remain stale.

In some embodiments, one or more widgets may include data from more than one source. In such cases, stale flags may be specified for each group of information obtained from a different source. The stale flag for the widget is set to indicate refreshed only when the flags for all groups in that widget indicate refreshed. When the stale flag for the widget is set (e.g., to indicate need refresh), stale flags for each of the groups within the widget are also set.

At operation 322, the client-side application renders the dashboard using widget data received from the server-side application. The returned data may specify, for each widget, whether the data has been refreshed or not. In some example embodiments, this information is passed as an additional parameter in the response for each widget (e.g., IsStale flag).

The information whether data for each widget is refreshed or not may be useful in generating data request (e.g., retry data requests) only for widgets that do not currently have refreshed data. During the rendering of the dashboard, the information as to whether each widget has refreshed data or stale data, may be used to visually distinguish the refreshed information from the stale (e.g., considered as potentially stale because the corresponding cache entry is indicated as such) information being displayed in the dashboard.

Some embodiments may display stale information in one or more predetermined formats (e.g., text/background colors, text styles, etc.) or other technique enabling the user to easily distinguish potentially stale information from refreshed information. Some embodiments may allow configuration settings specifying only certain of the widgets eligible for displaying cached data, and the rendering may display the dashboard while displaying only those widgets configured for caching with initial data received from a cache, and others of the widgets with no data values.

At operation 323, the job process 308 is invoked in accordance with a predetermined interval. The interval at which the job process 308 checks the queue may be configurable (e.g., 5 seconds). The time interval may at least partly determine how responsive the cache refresh and subsequent rendering is. However, too frequent checking of the MSMQ queue may unnecessarily increase processing load. The job process 308 repeatedly checks, at operation 324, whether any requests for cache refresh are pending. The checking may be performed on a MSMQ queue, as described above, which is used by the server-side application to enqueue cache refresh requests. If the job process 308 finds a request for cache refresh (e.g., "yes" at operation 324), at operation 325, job process 308 requests one or more data sources 310 for data. The configuration of each widget may identify the data source for its data. The request at operation 325 may be either for all the widgets of the dashboard or only for those identified as still having stale data. The data source 310, upon receiving the request, obtains the requested information at operation 326, and, if any data is found, that is sent at operation 327 to the job 308. In some other embodiments, job process may directly retrieve the information from the data source 310. When it has the requested information, the job process 308, at operation 328, refreshes the cache at the server-side application 304. The job process 308 may also update the stale flags to reflect the cache refresh.

As the cached data for each widget is refreshed from the data sources, the corresponding stale flag (or flags) is unset (i.e. to indicate that the corresponding cache has been refreshed or is currently being refreshed). The unsetting of the stale flags may be performed by the job process.

The client-side application 302 may continue retrying to obtain data for which it still has not received data from the cache. Thus, at operation 329 a first retry is made for one or more widgets for which no data has yet been received from the cache. The intervals between retries and the number of retries may be configurable. The retry request may indicate that it is the second request. The retry request may also identify each widget for which it still needs refreshed data.

Upon receiving the first retry request, the server-side application, at operation 330, may recognize that the cache includes refreshed information for one or more widgets (i.e., due to the refresh at operation 328). Accordingly, if there are refreshed data for any widgets requested in operation 329, then at least the data for those widgets is returned at operation 331. In some embodiments, when a response to the client-side application includes data for widgets for which the cache has been refreshed and data for widgets for which the cache is not yet refreshed, the status of the returned data for each widget as to whether the data is stale may be identifiable based upon a value included for each widget Upon receiving a reply from the server-side application, the client-side application, at operation 332, renders the dashboard with the received information including any refreshed data. Similar to operation 322, the rendering may indicate refreshed widgets in a manner distinguishable from potentially stale widgets.

In the illustrated scenario, one or more widgets still remain to receive refreshed information after operation 331. At operation 333, another retry data request is made. The data request message indicates the retry number and the particular widgets sought to be refreshed. In response, the server-side application at 334 recognizes that more than a predetermined number of retry attempts have been made for obtaining data for dashboard 100. It therefore, at operation 335, requests the required data without a cache refresh request. The request may be directly made to the appropriate data sources. The direct access to the data source, bypassing the queue, improves the responsiveness and robustness of the dashboard by having a second technique for obtaining the data in the event that the queue becomes backlogged.

The data source, at operation 336, finds the requested data, and at operation 337, the requested data is returned to the server-side application which refreshes the cache with the received data. At operation 338, the server-side application returns the refreshed data from the cache to the client-side application. The cache refresh by the server-side application by directly accessing the data source may be considered a synchronous refresh of the cache (in contrast to the asynchronous refresh performed by queuing a refresh request).

At operation 339, one or more stale flags are updated to represent the cache refresh completed.

At operation 340, client-side application renders the dashboard with information including any updated information.

If information from the cache (e.g. cache 224) has been received for all widgets currently displayed on the dashboard, then the client-side application has completed the display. If any of the widgets still remain with potentially stale information, the retrying may continue for a predetermined number of operations.

Figure 4:
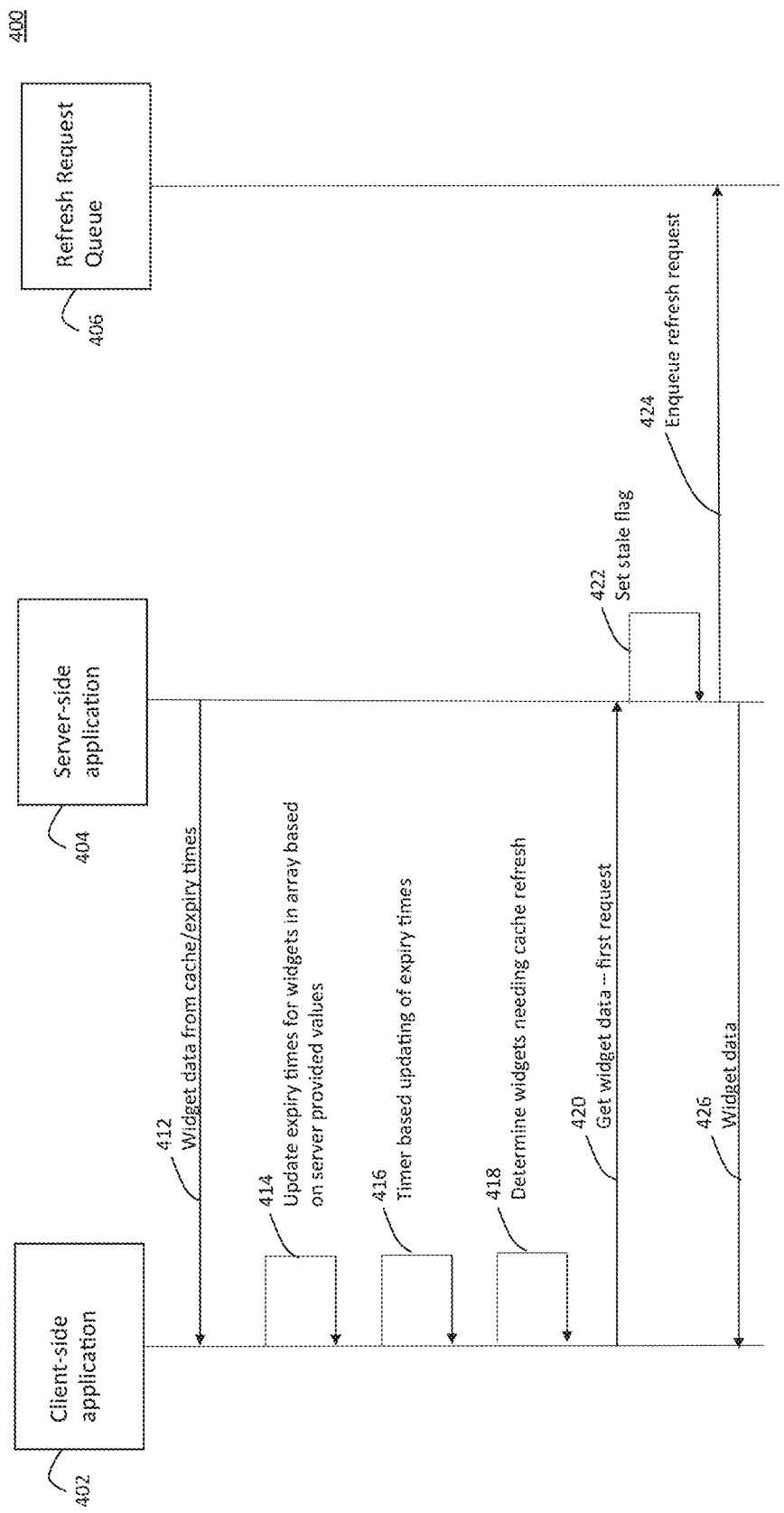
FIG. 4 illustrates a flowchart of process for refreshing the server-side cache according to some embodiments.

FIG. 4 illustrates a flowchart of process 400 for refreshing the server-side cache (e.g., cache 224) according to some embodiments. The flowchart illustrates interactions between client-side web application 402 and the server-side web application 404 leading to a cache refresh request being sent to queue 406. The cache refresh process and client-side rendering process thereafter is the same as, or is similar to, the process described in relation to FIG. 3.

At operation 412, the client-side application 402 receives, along with data from the cache for one or more widgets, the expiry times for those one or more widgets. The expiry times for each widget in the cache are continually (e.g., at predetermined intervals) updated by the server-side application or other process. The expiry times may be maintained in the server as time (e.g., in seconds) remaining before the cache entry expires (i.e., before refresh is desired).

On the client, the expiry times received from the server may be maintained in an array or other data structure in which multiple values can be periodically (e.g., triggered by a periodic timer) updated. At operation 414, the client-side application updates the array or other structure to include the received updated expiry times. The array may represent the refresh time for each of the widgets displayed on the dashboard. The time left before refresh for each of the widgets as indicated by the server-side application may be used to update the remaining time before refresh for widgets in the client's array.

At operation 416, based upon signal from a timer which expires at predetermined intervals, the remaining times for each of the widgets in the array are decremented by a predetermined amount. For example, if the timer is configured to fire in 5-second intervals, the amount of decrement at each expiration may be set to 5 seconds.

At operation 418, it is determined whether there are any widgets in the array for which the remaining time is less than or equal to 0 (or other predetermined low value indicating a very short time before requiring a refresh).

At operation 420, the client-side application requests data for each of the widgets identified as requiring data refresh. The request at operation 420 may indicate that it is a first request for refresh.

At operation 422, having received the request for data, and having recognized that it is a first request for data for the widget, the server-side application may set the stale flag corresponding to that widget to indicate that a refresh has been requested.

At operation 424, the server-side application enqueues a request for cache refresh for that widget to an MSMQ queue. At operation 426, data that is currently in the cache is returned to the requesting client-side application.

If the stale flag is already set when this first request for data is received at 424, then it indicates that a refresh request is already active for this widget, and therefore no refresh request will be queued in operation 424.

The subsequent client-side and server-side processing may be the same or similar to that described in relation to FIG. 3 after a request for cache refresh is enqueued and the corresponding stale flag is set to indicate a refresh has been requested. For example, a job process can, based on the queued request, obtain data from a data source and appropriately refresh the cache. If the cache is successfully refreshed the corresponding stale flag is reset by the job process to indicate that the cache contains up to date data for the widget. In the event that the cache is not refreshed by the time the server receives a certain number of retries from the client, the server directly access the data source to obtain the data and refresh the cache. The refreshed data is obtained by the client upon its next request retry.

FIG. 5 illustrates a part of an example XML configuration file 500 that can be used for configuring a displayed user interface such as a dashboard. The configuration file 500 can specify configuration data for each widget of a plurality of widgets (e.g., 502 and 503 for researchWidget and estimatesWidget, respectively), and details for each of the providers supplying data for the widgets (e.g., 504 and 505 for the data provider for the researchWidget and the data provider for the estimatesWidget, respectively).

For each widget, the configuration file may specify an identifier (e.g., 506) that uniquely identifies the widget, an indication whether the widget is cacheable (e.g., 510), a refresh interval (e.g., 512) indicating the frequency of refresh for the widget, and an identification of the provider (e.g., 514) for the data for the widget. The identifier for each widget may be used to identify the widget in requests for widget data, in response providing widget data, indexing the cache (e.g., cache 224) etc. The server-side application may cache only those widgets which are configured to be cacheable. For any widget that is not indicated as cacheable in the configuration file, its data may not be cached at the server. The refresh interval is specified per widget, and the server can use this configuration value to set the respective cache refresh timers. The configuration for a widget may also specify whether the data for the widget is to be refreshed upon a context change (e.g., 516). An example context change may occur when, in the "peer activity" widget illustrated in FIG. 1, the currently selected investment position is changed by the user. Upon such a change, the server may refer to the configuration setting for the "peer activity" widget to determine whether it requires to be refreshed on a context change.

Whereas the configuration for each widget can specify a provider name, details for each provider (e.g., address for obtaining data etc.) are provided in a separate section of the configuration file.

FIG. 6 illustrates an XML file 600 for an example user interface layout configuration according to some embodiments. The file 600 specifies two layouts 602 and 604. Layout 602 is configured to arrange three widgets on the dashboard, and layout 604 is configured to arrange ten widgets. Different layouts may be specified for each type of user device and/or as a default layout. The layout configuration may specify a position configuration for each widget. The position configuration for each widget may be used by the framework which renders the user interface to load the widget into the container corresponding to that position identifier. The configuration shown in file 600 is an example only, and it should be appreciated that the configuration file may have any number of layouts each having the same or different sets of widgets arranged in different patterns.

FIG. 7 illustrates an example database schema 700 that can be used for the server-side cache (e.g., cache 224), according to some embodiments. Each cache entry may have a unique identifier 702, and may identify the widget (i.e. WidgetId 704) and the user (i.e. userId 706) to which the corresponding cached data relates to. The data (i.e., value 708) may be specified in the schema as a variable length binary data in order to offer flexibly caching different types of data.

Each cache entry may also specify an expiry time (i.e. expiry 710) and a last refreshed time (i.e., LastUpdated 712) indicating when the cache entry was last refreshed. The expiry time may be updated upon each cache refresh to represent the next time at which it should be refreshed. For example, the next expiry time can be determined based upon the time of a current refresh and the refresh interval from the configuration.

The updatedByUI 714 flag represents whether the user interface requires refreshed data for the widget. This indicates whether the data in cache was refreshed by the web server application rather than the job process. A large number of cache items with this flag set to true may indicate that the job is either not healthy or not able to handle the load on the queue.

The layoutId 716 identifies a layout for the display of this widget on the user interface. For example, the layoutID 716 may specify one of the layouts defined in the dashboard configuration file. ViewTypeId 718 specifies a type of display for the widget. The type of view for the widget may be considered when the data from the sources need to be translated before being displayed on the dashboard. LayoutId 716 may be helpful in retrieving the cache data for all widgets in a particular dashboard easily without having to match all the widget identifiers for that dashboard. This is mainly a performance improvement factor. ViewTypeId 718 may be used when a widget can show data based on some criteria which can be switched by the user. At any time, the user sees only data for one criteria. This field may be helpful in filtering data based on the currently selected criteria. Key 720 may be a field used to store a dynamic key based on which widget data need to be retrieved.

Figure 8:
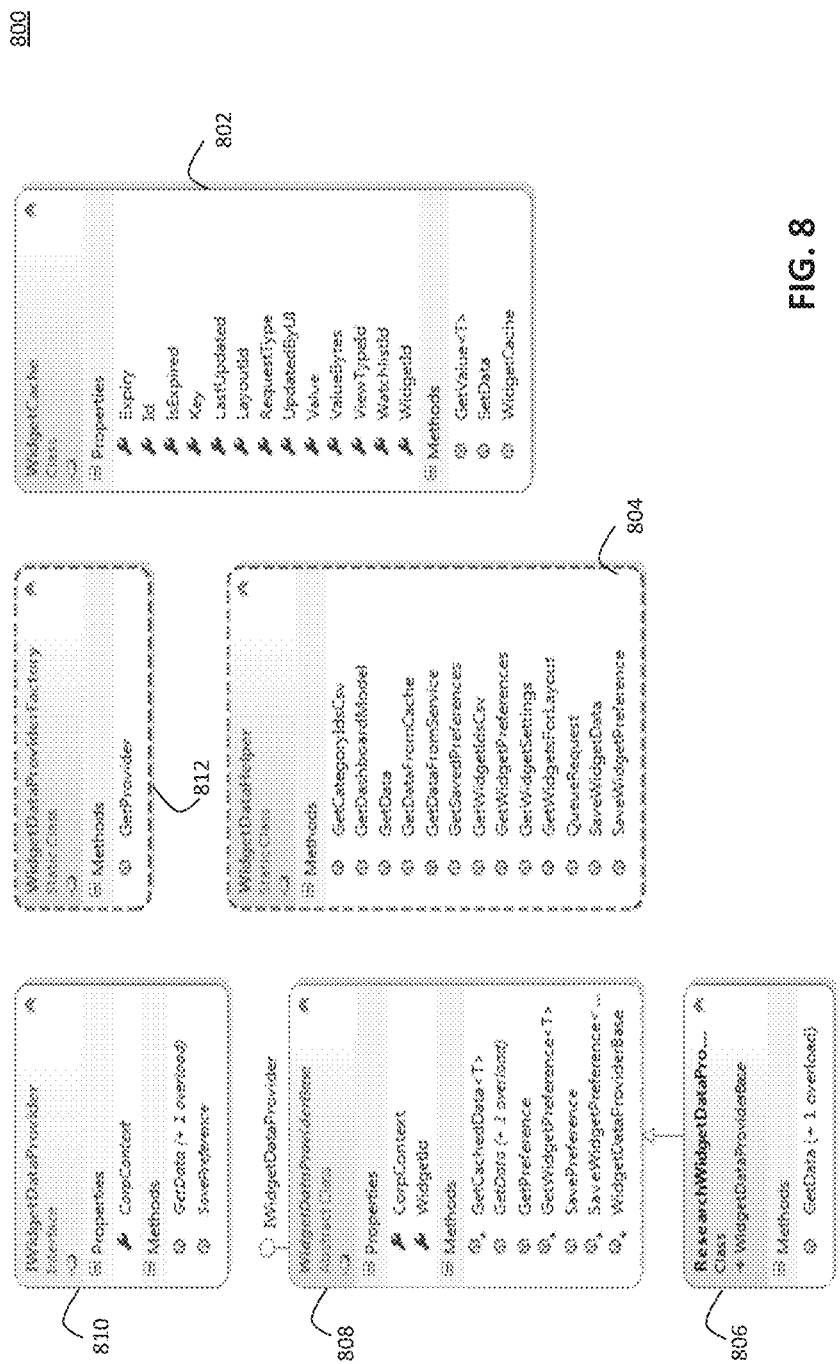
FIG. 8 schematically illustrates a part of an example framework of software elements that may be used in some embodiments.

FIG. 8 schematically illustrates a part of an example framework 800 that may be used in some embodiments. The framework 800 may illustrate, for example, aspects of the server-side cache (e.g., cache 224). The server-side cache may comprise a plurality of objects of WidgetCache 802 class. For example, the server-side cache may include a plurality of objects corresponding to class 802. WidgetCache 802 may be defined as a generic cache type, and may store the data received from the data sources in binary serialized form.

The server-side application may rely upon a WidgetDataHelper class 804 to maintain the cache and to provide the clients with requested data according to embodiments. WidgetDataHelper class 804 may rely upon a data provider class specified for each type of widget. The class 804 may provide for identifying displayable widgets based on configurations and entitlements, etc., retrieving cached data for all widgets, retrieving preferences for all widgets, invoking the appropriate method on data providers based upon type of request received from the client, facilitating save data to cache, facilitating saving preferences for a widget, etc. For example, data for display in widgets of ResearchWidget type may be obtained by the WidgetDataHelper class 802 calling a ResearchWidgetProvider class 806. ResearchWidgetProvider class 806 can be responsible for accessing its data provider. Because the cached information is in binary serial format, ReasearchWidgetDataProvider class 806 may also provide for translating/converting the data from binary serialized form to a different format as required by the particular widget.

ResearchWidgetDataProvider class 806 may inherit from a WidgetProviderBase class 808, which in turns implements an interface class IWidgetDataProvider 810. A factory class WidgetDataProviderFactory 812 can be used to generate the respective data provider objects for each type of widget.

FIG. 9 illustrates an example of the IwidgetDataProvider 810 interface. The interface specifies two methods: a GetData with the current widget setting and layout type as parameters, and a GetData with the cached data as parameters. The appropriate GetData method is called depending on whether cached data is available or needs to be fetched from the actual source.

Figure 10:
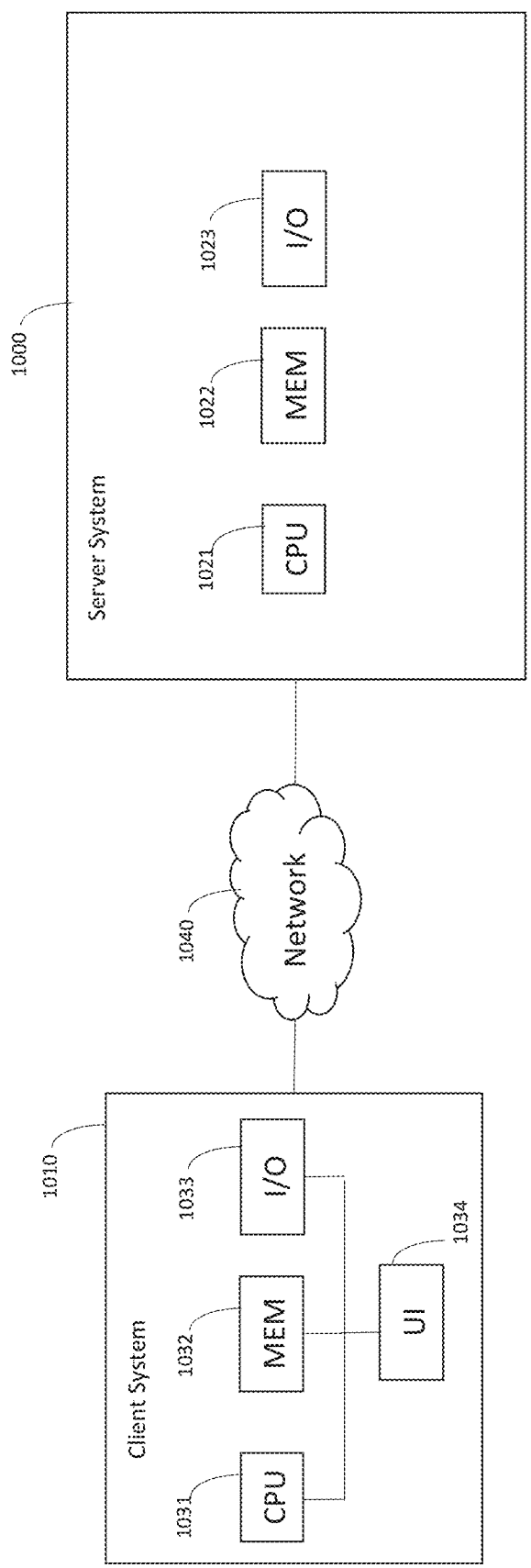
FIG. 10 shows an example block diagram of a hardware architecture for the system shown in FIG. 2 according to some embodiments.

FIG. 10 shows an example block diagram of a hardware architecture for the system 200 according to some embodiments. The client system 1010 communicates with a server system 1000 via a network 1040. The network 1040 could comprise a network of interconnected computing devices, such as the internet. The network 1040 could also comprise a local area network (LAN) or could comprise a peer-to-peer connection between the client system 210 and the server system 1000.

The example client system 1010 and server system 1000 could correspond to client system 202 and server system 204 as shown in FIG. 2. That is, the hardware elements described in FIG. 10 could be used to implement the various software components and actions shown and described herein with reference to FIG. 2 etc. For example, the client system 1010 could include at least one processor CPU 1031, at least one memory 1032, at least one input/output device I/O 1033, and a component for generating and displaying a user interface UI 1034. The I/O device 1033 can be all encompassing and could include a communication device, such as a transceiver for sending and receiving data (e.g., a wireless transceiver, a wired transceiver). I/O device 1033 could also include an interface for connecting a non-transitory computer readable storage medium to the client system 1010 to send and receive data.

It should be appreciated that the combination of elements in client system 1010 could be used to implement the example web browser application 214 shown in FIG. 2. For example, the memory 1032 could load the files associated with the application (e.g., HTML, XML, JavaScript files) and the CPU 1031 could be used to operate the rendering module, networking module, and JavaScript module discussed above to generate the application. Likewise, the I/O device 1033 could be utilized by the networking module to fetch the various elements comprising the SPA from the server system 1000.

Server system 1000 also comprises various hardware components used to implement the software elements for server system 204 as shown in FIG. 2. For example, server system 1000 could also include hardware components of at least one processor CPU 1021, at least one memory 1022, and at least one input/output device I/O 1023. The I/O device 1023 can be all encompassing and could include a communication device, such as a transceiver for sending and receiving data (e.g., a wireless transceiver, a wired transceiver). I/O device 1023 could also include an interface for connecting a non-transitory computer readable storage medium to the server system 1000 to send and receive data. In one example embodiment, I/O device 1033 of the client system can perform communication via the network with I/O 1023 of the server system.

Similar to client system 1010, the server system 1000 could implement the components for generating the application. For example, the memory 1022 could be used to store the information in database 220 as well as the components and files utilized by web server 216 and application server 218. The CPU 1021 could be used in executing the software necessary to generate the respective modules that are requested by and transmitted to the client system 1010. For example, CPU 1021 could be used to generate the necessary modules created by application server 218. Likewise, I/O device 1023 can be used by the web server 216 to transmit the different application elements to the client system 1010. Of course, these examples are non-limiting and the system envisions utilizing the hardware elements in a variety of aspects.

In the examples described herein, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions. Although databases may be depicted as tables below, other formats (including relational databases, object-based models, and/or distributed databases) may be used to store and manipulate data.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the technology, and does not imply that the illustrated process is preferred.

Various forms of computer readable media/transmissions may be involved in carrying data (e.g., sequences of instructions) to a processor. For example, data may be (i) delivered from a memory to a processor; (ii) carried over any type of transmission medium (e.g., wire, wireless, optical, etc.); (iii) formatted and/or transmitted according to numerous formats, standards or protocols, such as Ethernet (or IEEE 802.3), ATP, Bluetooth, and TCP/IP, TDMA, CDMA, 3G, etc.; and/or (iv) encrypted to ensure privacy or prevent fraud in any of a variety of ways well known in the art. As used in this document, the term "non-transitory computer readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "processing system" as used in this document means at least one of a CPU, GPU, ASIC, FPGA or other hardware circuit for executing instructions, such as, for example, the software programs comprising the above described web application.

When it is described in this document that an action "may," "can," or "could" be performed, that a feature or component "may," "can," or "could" be included in or is applicable to a given context, that a given item "may," "can," or "could" possess a given attribute, or whenever any similar phrase involving the term "may," "can," or "could" is used, it should be understood that the given action, feature, component, attribute, etc. is present in at least one embodiment, though is not necessarily present in all embodiments.

While the technology has been described in relation to AngularJS, this is done for ease of description; it is to be understood that the technology described in this document is applicable in the context of other SPA technologies, other web technologies, and/or any other software technology.

While the technology has been described in connection with what is presently considered to be the most practical and preferred embodiment, it is to be understood that the technology is not to be limited to the disclosed embodiment, but on the contrary, is intended to cover various modifications and equivalent arrangements.

The invention claimed is:

1. A system comprising:
a client device including a first processing system having at least one processor, a display device and a network communication interface, the first processing system being configured to perform operations comprising:
transmitting a plurality of data requests via the network communication interface, each data request including a retry number and requesting data for one or more widgets of a plurality of widgets displayable in a user interface of a web application; and
a server device including a second processing system having at least one processor and a memory including a cache, the second processing system being configured to perform operations comprising:
configuring the cache to store, for each of a plurality of users, data for the plurality of widgets;
receiving the plurality of data requests from the client device, the plurality of data requests each with an included respective retry number;
initiating an asynchronous refresh of a portion of the cache in response to a first respective retry number below a preconfigured threshold, and initiating a synchronous refresh of the portion of the cache in response to a second retry number equal to or higher than the preconfigured threshold; and
transmitting, to the client device, at least a first response to the data request in association with the initiated synchronous refresh or the initiated asynchronous refresh;
wherein the first processing system of the client device is configured to perform further operations comprising:
displaying the user interface on the display device using at least a first set of data received with the first response from the server device in response to the plurality of data requests.

2. The system according to claim 1, wherein the second processing system is configured to perform further operations comprising:
responsive to a first data request of the plurality of data requests, initiating a refresh of the cache for one or more of the plurality of widgets,
when initiating the refresh, setting at least one flag indicating a status of data for a widget in the cache; and
in response to receiving a second data request having a retry number corresponding to a predetermined retry number, (1) if the at least one flag is not set, initiate the refresh of the cache and set the at least one flag; and (2) if the at least one flag is set, return data from the cache to the client device.

3. The system according to claim 1, wherein the first processing system is configured to perform further operations comprising:
storing a respective update timer for each of the plurality of widgets;
monitoring the respective update timer; and
when an update of a widget comes due, requesting the update.

4. The system according to claim 1, wherein the second processing system is further configured to:
responsive to receiving a first data request of the plurality of data requests, transmit the first set of data from the cache to the client device in the first response before refreshing the cache, and transmit a second set of data from the cache in a second response after the cache is refreshed;
and wherein the first processing system is further configured to:
overwrite using the second set of data received with the second response, for one or more of the plurality of widgets, information previously displayed using the first set of data received from the server in response to the plurality of requests, wherein the first set of data is received before the second set of data.

5. The system according to claim 1, wherein the first processing system is configured to perform the transmitting the plurality of data requests in response to a user request to display the user interface.

6. The system according to claim 5, wherein the first processing system is configured to launch a client-side of the web application on the client device in response to the user request.

7. The system according to claim 6, wherein the first processing system is further configured to execute the client-side of the web application in a browser.

8. The system according to claim 1, wherein the first processing system is configured to perform further operations comprising repeatedly transmitting the plurality of data requests for at least one of the plurality of widgets for which last returned data is from the cache before the cache is updated for the at least one of the plurality of widgets.

9. The system according to claim 8, wherein the second processing system is configured to perform further operations comprising:
in response to receiving a data request from the client device, determining whether a number of repeated data requests exceeds the preconfigured threshold;
when the repeated data requests exceeds the threshold, directly accessing a data source to obtain data; and
returning the obtained data to the client device.

10. The system according to claim 1, wherein the user interface includes a dashboard having the plurality of widgets arranged thereon.

11. The system according to claim 1, wherein the first processing system is configured to perform further operations comprising:
   monitoring cache expiration times for the plurality of widgets arranged on the user interface;
   based upon the monitoring, determining an expiration of cached data for a first one of the plurality of widgets; and
   causing a refresh of data in the cache for the first one of the plurality of widgets.

12. A server device comprising:
   a memory including a cache;
   a processing system having at least one processor, the processing system being configured to perform operations comprising:
      configuring the cache to store, for each of a plurality of users, data for a plurality of widgets that are displayable on a user interface provided by a web application;
      receiving, from the user interface of a client device a plurality of data requests each with an included retry number;
      initiating an asynchronous refresh of a portion of the cache in response to a first respective retry number below a preconfigured threshold, and initiating a synchronous refresh of the portion of the cache in response to a second retry number equal to or higher than the preconfigured threshold; and
      transmitting, to the client device, at least a first response to the data request in association with the initiated synchronous refresh or the initiated asynchronous refresh.

13. The server device according to claim 12, wherein the processing system is further configured to initiate an asynchronous refresh of the cache as a first action in response to receiving a data request with a first retry number, and to initiate a synchronous refresh of the cache as a second action in response to receiving a data request with a second retry number, the first and second retry numbers being different.

14. A method performed by one or more processors of a server device, the method comprising:
   configuring a cache to store in a memory accessible to the server device, for each of a plurality of users, data for a plurality of widgets that are displayable on a user interface provided by a web application;
   receiving via a network interface of the server device, from the user interface of a client device a plurality of data requests each with an included retry number;
   initiating an asynchronous refresh of a portion of the cache in response to a first respective retry number below a preconfigured threshold, and initiating a synchronous refresh of the portion of the cache in response to a second retry number equal to or higher than the preconfigured threshold; and
   transmitting via the network interface of the server device, to the client device, at least a first response to the data request in association with the initiated synchronous refresh or the initiated asynchronous refresh.

15. The method according to claim 14, further comprising:
   responsive to a first data request of the plurality of data requests, initiating a refresh of the cache for one or more of the plurality of widgets,
   when initiating the refresh, setting at least one flag indicating a status of data for a widget in the cache;
   in response to receiving a second data request having a retry number corresponding to a predetermined retry number, (1) if the at least one flag is not set, initiate the refresh of the cache and set the at least one flag; and (2) if the at least one flag is set, return data from the cache to the client device.

16. The method according to claim 14, further comprising initiating the asynchronous refresh of the cache as a first action in response to receiving a data request with a first retry number, and initiating the synchronous refresh of the cache as a second action in response to receiving a data request with a second retry number, the first and second retry numbers being different.

17. A non-transitory computer-readable storage medium storing instructions that, when executed by a processor of a server device, causes the server device to perform operations comprising:
   configuring a cache to store in a memory accessible to the server device, for each of a plurality of users, data for a plurality of widgets that are displayable on a user interface provided by a web application;
   receiving, from the user interface of a client device a plurality of data requests each with an included retry number;
   initiating an asynchronous refresh of a portion of the cache in response to a first respective retry number below a preconfigured threshold, and initiating a synchronous refresh of the portion of the cache in response to a second retry number equal to or higher than the preconfigured threshold; and
   transmitting, to the client device, at least a first response to the data request in association with the initiated synchronous refresh or the initiated asynchronous refresh.

* * * * *